United States Patent [19]

Gunn

[11] Patent Number: 4,838,315
[45] Date of Patent: Jun. 13, 1989

[54] HANDLE FOR A SEPTIC SYSTEM DRAIN HOSE

[76] Inventor: Gordon W. Gunn, 2296 Pillon Rd., Twin Lake, Mich. 49457

[21] Appl. No.: 174,828

[22] Filed: Mar. 29, 1988

[51] Int. Cl.4 .............................................. A01G 25/09
[52] U.S. Cl. .............................. 137/899.3; 137/355.16; 138/89
[58] Field of Search ................. 138/89, 105, 106, 108, 138/109, 178; 137/355.16, 355.2, 121, 899, 899.3

[56] References Cited

U.S. PATENT DOCUMENTS

| | | | |
|---|---|---|---|
| 3,712,331 | 1/1973 | Otto | 137/355.16 |
| 3,811,462 | 5/1974 | Feliz | 137/355.16 |
| 4,111,225 | 9/1978 | Phelps | 137/565 |
| 4,133,347 | 1/1979 | Mercer | 137/355.16 |
| 4,231,595 | 11/1980 | Knutsen | 137/899.3 |
| 4,554,949 | 11/1985 | Sell | 137/899 |

*Primary Examiner*—A. Michael Chambers
*Attorney, Agent, or Firm*—Waters, Morse & Harrington

[57] ABSTRACT

A handle is engageable with the end coupling of a drain hose for a septic system to facilitate insertion and removal of the hose in and from the storage position in the tubular bumper of a house trailer. The handle provides a grip adjacent the hose axis, and is moveable to a position where the end surface of the coupling is unobstructed.

6 Claims, 3 Drawing Sheets

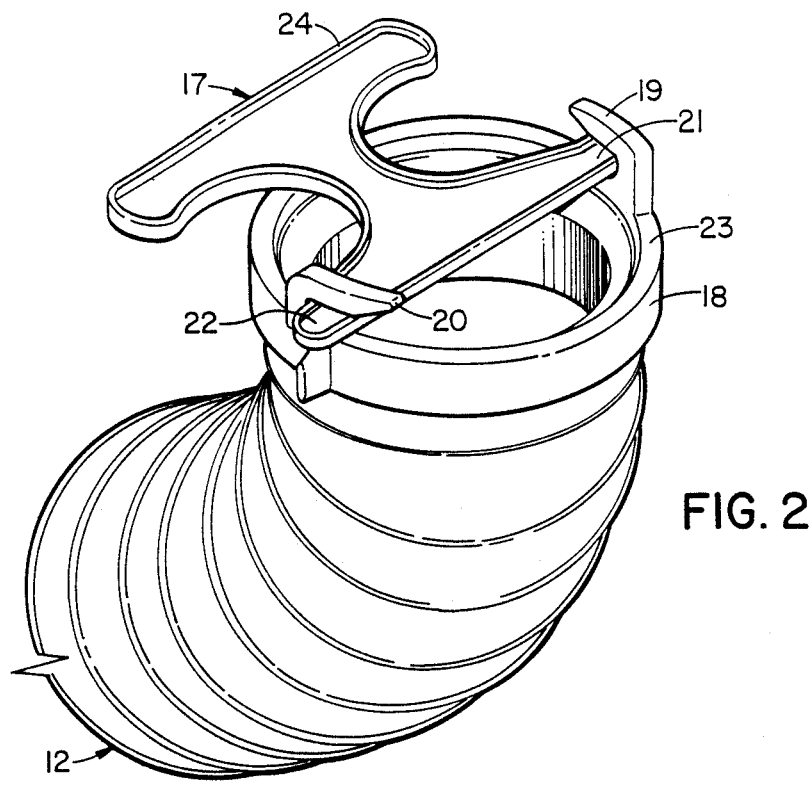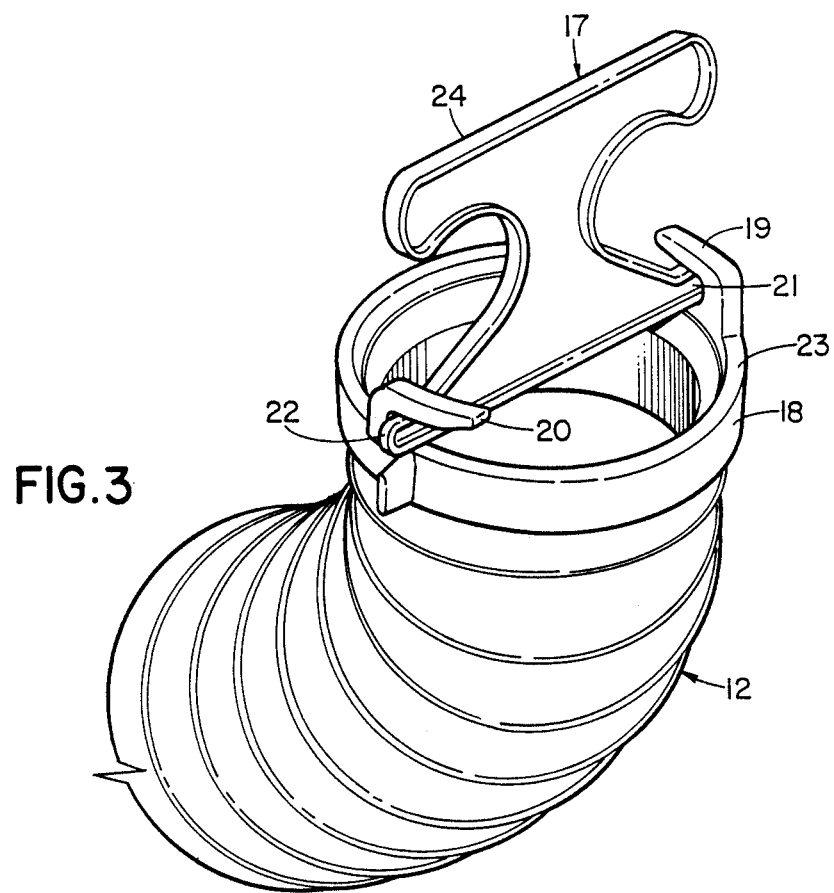

HANDLE FOR A SEPTIC SYSTEM DRAIN HOSE

BACKGROUND OF THE INVENTION

The plumbing facilities of house trailers commonly terminate in an accumulator tank that must be drained periodically. The procedure for accomplishing this involves the placement of the trailer within a few feet of a receiving tank present in trailer park areas. A special hose is connected to the accumulator tank of the trailer and to the receiving tank, and opening a dump valve will result in a transfer of the accumulated material. This is usually followed by a flushing operation. The transfer hose is usually stored in the trailer, and returned to storage position after the operation has been completed. It has recently become common practice to provide storage space for the hose in the tubular rear bumper of the trailer. A suitable cap closes off the open end of the bumper after the hose has been placed in storage position. Obviously, the handling of the hose is a somewhat distasteful job, and is commonly performed with the aid of rubber gloves. The hoses have a standard coupling for engaging the accumulator tank of the trailer, with the coupling and the tank fitting providing for a twist lock that secures the hose in position. While this can be performed while gripping the relatively clean exterior of the hose, the removal of the hose from storage position in the bumper requires laying hold of the end of the coupling within the open end of the bumper. This is the portion of the operation that has been responsible for the common use of rubber gloves.

SUMMARY OF THE INVENTION

A handle is provided by the present invention that is engageable with the standard coupling of a septic system drain hose, and provides a hand grip adjacent the hose axis that permits force to be applied to the hose assembly to withdraw the hose from storage position without manual contact with soiled surfaces at the end of the hose. The handle also permits the hose to be pushed back into storage position without kinking it. The handle is moveable to a position where it leaves the end surface of the coupling unobstructed, so that it will not interfere with the engagement of the coupling with the accumulator tank fitting.

DESCRIPTION OF THE DRAWINGS

FIG. 2 is a perspective view showing an intermediate step in the attachment of a handle to the hose coupling.

FIG. 3 is a perspective view showing the final position of the preferred form of the hose handle.

DESCRIPTION OF THE PREFERRED EMBODIMENTS

Figure 1:
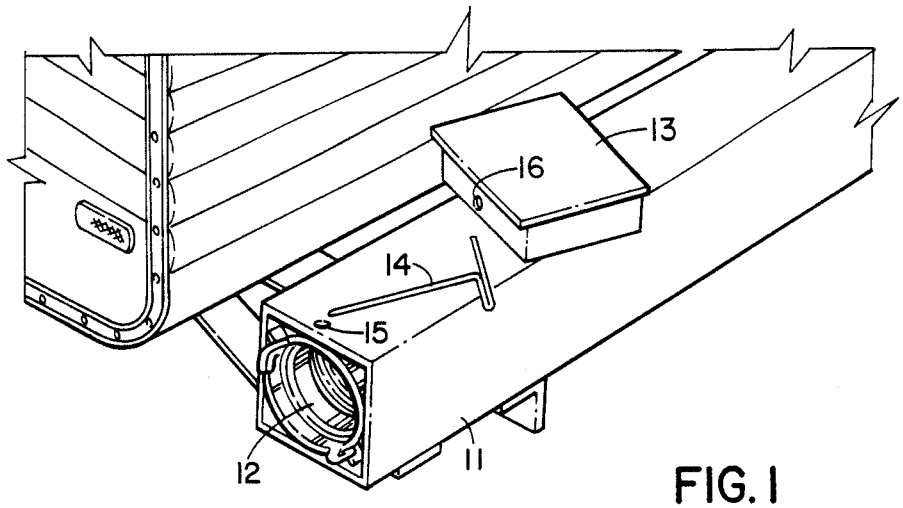
FIG. 1 is a perspective view of the rear portion of the house trailer, showing the tubular bumper and a drain hose in storage position.

In FIG. 1, the rear end of a house trailer is indicated at 10, and the square tubular bumper 11 forms a storage container for the drain hose assembly 12. The end of this assembly has been exposed by the removal of the bumper cap 13 normally closing off the end of the bumper 11, and held in position by the T pin 14, traversing holes as shown at 15 in the end of the bumper 11, and at 16 in a portion of the cap 13 that enters into the end of the bumper 11.

Referring to FIGS. 2 and 3, the hose is easily manipulated by the attachment of the handle 17. The standard coupling 18 forming the end of the hose assembly is provided with the horns 19 and 20 extending in opposite directions at diametrically opposite points on the coupling. The handle is first engaged with the coupling in the position shown in FIG. 2. The handle is then in a plane perpendicular to the axis of the coupling, with the ends 21 and 22 of the handle engaged under the horns 19 and 20 respectively. The thickness of these handle ends is less than the gap between the horns 19 and 20 and the front edge 23 of the coupling, but the width of the ends 21 and 22 is slightly in excess of this gap. Rotation of the handle 17 from the FIG. 2 to the FIG. 3 position requires a small amount of force, but results in a solid interengagement sufficient to assure that the handle stays in place. The gap between the horns 19 and 20 and the end surface 23 forms peripheral slots that permit the handle to be engaged in the FIG. 2 position by slight rotation about the axis of the coupling. With the handle in the FIG. 3 position, the grip portion 24 extends diametrically across the axis of the hose, and thus provides a point at which force can be applied to move the hose into and from the storage position in the bumper. Forces applied near the axis of the hose have a minimum tendency to induce a kink in the hose during these movements.

Figures 4, 5:
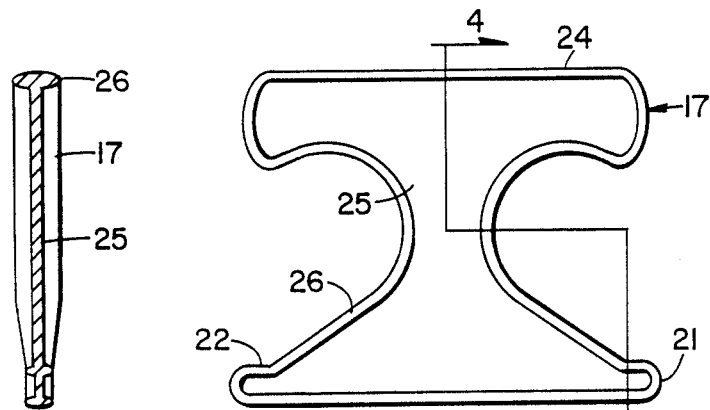
FIG. 4 is a sectional side elevation of the handle shown in FIGS. 2 and 3, on the plane 4—4 of FIG. 5.
FIG. 5 is a plan view with respect to FIG. 4.
Figure 6:
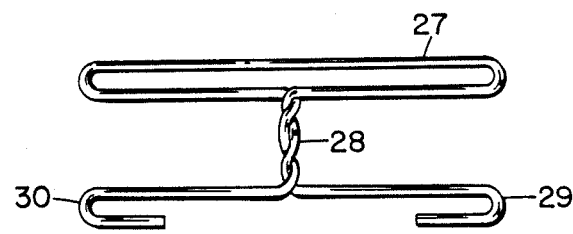
FIG. 6 is a plan view of a modified form of the invention.

The hose handle shown in FIGS. 2 and 3 is preferably molded from plastic material in the configuration best shown in FIGS. 4 and 5. The combination of the central web 25 and the peripheral flange 26 provides the necessary strength and rigidity required for its use. FIG. 6 illustrates a modified form of the invention in which the handle is fabricated from bent wire. The handle portion 27 is formed by a flat loop terminating in the twist 28, with the ends of the wire at the opposite side of the twist being extended radially and provided with the reverse bends 29 and 30 which function similarly to the ends 21 and 22 of the handle shown in FIGS. 4 and 5. The bent wire version appearing in FIG. 6 has some advantage in the natural resilience of the ends 29 and 30, but the molded configuration of FIGS. 4 and 5 has many other advantages. The plastic material of which the handle is molded can be of an infinite variety of colors, the so-called "blaze orange" being recommended, not only for its appearance, but for the ease with which the handle can be seen if it becomes mislaid.

Figure 7:
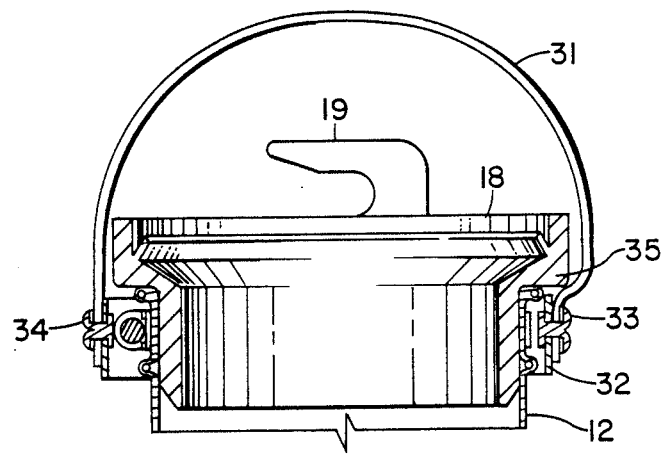
FIG. 7 is a section elevation at the hose coupling, showing a further modification of the invention.

Referring to FIG. 7, a modified form of the invention is shown in which a bail-type handle 31 is pivotally connected to a ring 32 at the rivets 33 and 34. The length of the bail 31 is such that it can be rotated about the rivets to a position where it does not obstruct the end of the coupling 18. In this position, it is slipped over the opposite end of the hose assembly 12, and slid along the hose until it abuts the flange 35 of the coupling. In this position, it can be swung to the FIG. 7 position to form a handle extending diametrically across the end of the coupling to function in the same manner as the handle shown in FIGS. 2 and 3. When the hose is returned to storage position in the bumper, the handle is again swung 90° from the FIG. 7 position, and the flexibility of the handle is such that it is easily shoved into a position in which it is received within the confines of the bumper 11. The handle shown in FIGS. 2 and 3, if desired, can be left in the FIG. 3 position when the hose is stored within the bumper. It is, of course, removed prior to the attachment of the hose to the accumulator tank of the trailer.

I claim:

1. In combination with a tubular storage receptacle and a drain hose for a septic system, said hose having an end coupling providing an end surface having a pair of horns each defining a peripheral slot axially beyond the end surface of said flange, a handle engageable with said coupling including a grip portion extending transversely with respect to and beyond said end surface, said grip portion being moveable to a position wherein said horns and end surface are unobstructed, said handle being at least partially receivable in said receptacle.

2. A combination as defined in claim 1, wherein said handle has a pair of oppositely-extending projections engageable with said slots.

3. A combination as defined in claim 2, wherein said projections have a greater width than thickness, and said thickness is freely receivable in said slots, said width being receivable therein only in a force fit on rotation of said handle into an axial diametrical plane.

4. A combination as defined in claim 1, wherein said handle has oppositely-extending portions engageable with said horns.

5. A combination as defined in claim 4, wherein said oppositely extending portions are formed by a return bend of relatively heavy wire.

6. In combination with a drain hose for a septic system, said hose having a coupling with an open end, a handle engageable with said coupling including a grip portion extendable to a position across said open end and beyond the end surface thereof, wherein said coupling has a radially extending flange, and said handle has a ring portion receivable over said hose, but smaller in inside diameter than the external diameter of said flange, said grip portion being in the form of a bail pivotally connected to said ring portion and extendable around said flange at opposite sides thereof.

* * * * *